United States Patent
Anscher

[19]

[11] Patent Number: 5,920,968
[45] Date of Patent: Jul. 13, 1999

[54] RESTRAINING STRAP ATTACHER

[75] Inventor: Joseph Anscher, Muttontown, N.Y.

[73] Assignee: National Molding Corporation, Farmingdale, N.Y.

[21] Appl. No.: 08/868,759

[22] Filed: Jun. 4, 1997

[51] Int. Cl.[6] ............................................. A44B 21/00
[52] U.S. Cl. ................................. 24/598.2; 24/16 PB
[58] Field of Search ................. 70/457–459; 24/598.2, 24/601.2, 702, 669, 16 PB; 280/33.992, 33.993

[56] References Cited

U.S. PATENT DOCUMENTS

| | | |
|---|---|---|
| 2,871,691 | 2/1959 | Bacon . |
| 3,881,334 | 5/1975 | Wilson . |
| 4,061,873 | 12/1977 | Berg, Jr. et al. ................ 24/601.1 X |
| 5,138,855 | 8/1992 | Faris . |
| 5,263,726 | 11/1993 | Wood . |
| 5,333,361 | 8/1994 | Schaede ........................ 24/16 PB X |
| 5,619,909 | 4/1997 | Volk .............................. 24/16 PB X |

*Primary Examiner*—James R. Brittain
*Attorney, Agent, or Firm*—Kenyon & Kenyon

[57] ABSTRACT

An attacher for restraining straps or belts of a restraining system has a belt member with a rounded shape which engages a loop of a restraining belt or strap, a surrounding member and interconnection means to enclose the strap attacher around an anchoring member, for example, of a shopping cart. The belt and surrounding members include cavities therethrough, such that cracks which may develop in these members will be limited, thus preventing catastrophic failure of the strap attacher.

7 Claims, 4 Drawing Sheets

RESTRAINING STRAP ATTACHER

FIELD OF THE INVENTION

The invention generally relates to attachment devices for anchoring straps, belts or various other restraining means to an anchoring member. The invention is particularly applicable to attachment devices used in belt restraining systems for child seats of shopping or grocery carts.

BACKGROUND INFORMATION

In implementing belt or strap type restraining systems, it is sometimes necessary to provide an attachment device to make a connection between an anchoring member and the restraining belts. For instance, the commonly used shopping cart having a child seat (such as might be found at a supermarket or grocery store) may employ a belt restraining system to prevent a child from climbing out of the child seat and causing injury. The restraining system is commonly implemented using belts having opposing buckle pieces attached at an end of each belt. When the buckle pieces are engaged, the belts are fitted tightly around the child's waist, thus restraining the child from exiting the child seat. The buckle pieces can then be disengaged when it is desired to remove the child from the seat.

In order to create the restraining effect, the belts used in this system must themselves be anchored to a portion of the shopping cart in order to withstand the applied forces of the restrained object (e.g. a child). It is preferred, however, that the restraining belts of the restraining system not need to be altered in the attachment process, as this adds considerable time and cost to the manufacturing process, and may result in a weak connection. For example, it is uneconomical to stitch the restraining belts to surround an anchoring member of the shopping cart. Also, attaching a restraining belt using a hook and loop connector may result in a weak or easily removed attachment.

As a result of these deficiencies, attachment devices are generally used to accomplish the desired anchoring. Attachment devices generally allow the belts or straps of the restraining system to be anchored to the shopping cart by engaging a loop at an end of the restraining strap and by surrounding an anchoring member in the shopping cart. The attachment device creates the connection between the shopping cart and the restraining strap when an interlocking mechanism on the attachment device is engaged, causing the attachment device to completely surround the anchoring member. It is generally desirous that the attachment device provide the strongest possible connection between the shopping cart and the restraining belts or straps in order to prevent failure of the restraining system.

Attachment devices have been constructed in various forms. For example, an attachment device presently available is constructed from molded plastic and has a V-shaped surrounding member, with two opposing straight bars each attached to either end of the surrounding member. All pieces of the attachment device are solid and cylindrical. The two straight bars terminate with mating portions of an interlock mechanism, such that the straight bars may be locked together to form a connection. When connected, the straight bars form a straight belt member for engaging a loop of a restraining belt, and also thereby surround an anchoring structure within the attachment device.

Also available is an attachment device of molded plastic design, formed in approximately a D-shape. A straight bar is used as a belt member to engage a loop at the end of a restraining belt, and a D-shaped surrounding member is coupled at one end to the straight bar such that the attachment device can surround the anchoring structure. A snap interlock is provided on opposite mating ends of the surrounding member and the belt member to lock the attachment device closed once it has been engaged with the restraining strap and the anchoring member of the shopping cart. As with the previous attachment device, the members are also solid.

Difficulties may arise with these designs which can degrade their effectiveness. The straight bar typically used as a belt member is relatively inflexible, such that when a strong, sharp force is applied by the belt to the attachment device, the attachment device is prone to fracture. Also, cracks can develop in the solid members of the attachment device from other sources (for example from age, weathering, improper use, or manufacturing defects). Whatever the source, cracks can spread through the solid member when force is applied to the attachment device, eroding its resistive properties. Once a crack has extended completely through the solid member, catastrophic failure occurs, and the device must be replaced.

SUMMARY OF THE INVENTION

As an exemplary embodiment of the attachment device of the invention, a shopping cart strap attacher is disclosed, comprising: a belt member for engaging a strap of a restraining system, the belt member having an outwardly rounded shape; a surrounding member coupled at an end to an end of the belt member; a first connector member coupled to another end of the belt member; and a second connector member coupled to another end of the surrounding member, such that the first connector member and second connector member are connectable to each other to form a connection. The belt member and the surrounding member of the strap attacher contain a number of cavities arranged therethrough.

By including the cavities through the belt member and surrounding member, cracks which may develop in the strap attacher can be limited such that they do not proliferate through the entire width of the strap attacher, and thus catastrophic failure of the strap attacher can be avoided. By using an outwardly curved belt member, short sharp forces exerted by the restraining strap (for example by jerking) can be withstood by flexing of the belt member, and the possibility of breakage is reduced.

The strap attacher is preferably formed as a single assembly from molded plastic.

DETAILED DESCRIPTION OF THE DRAWINGS

Figure 1:
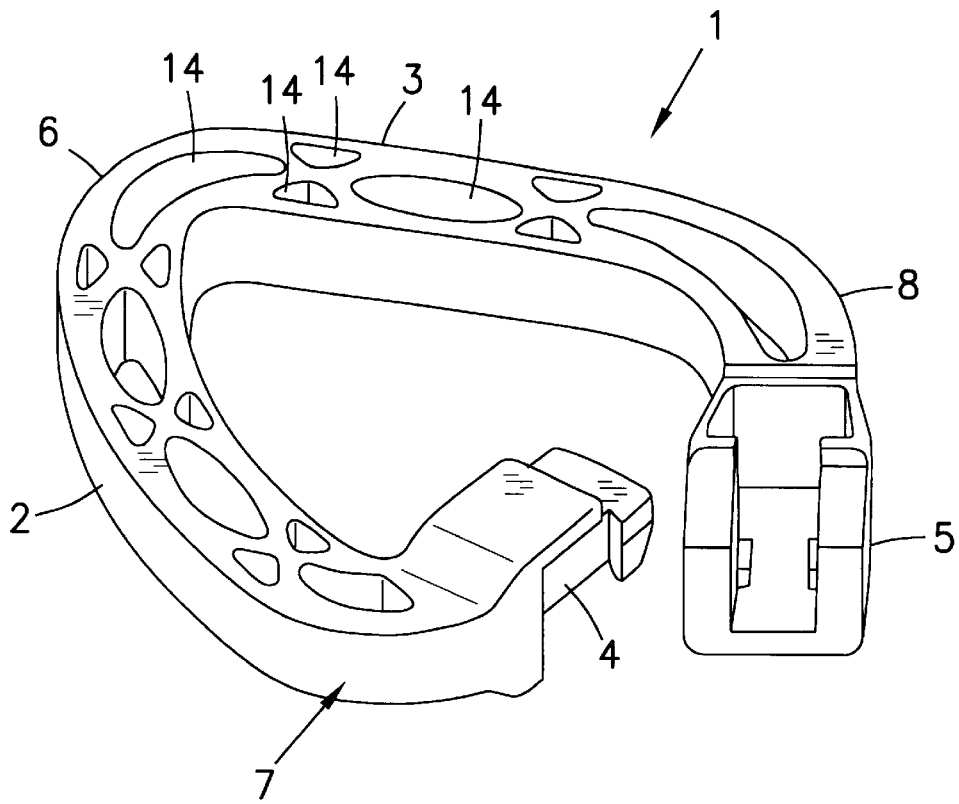
FIG. 1 shows a perspective view of a strap attacher according to the invention.
Figure 2:
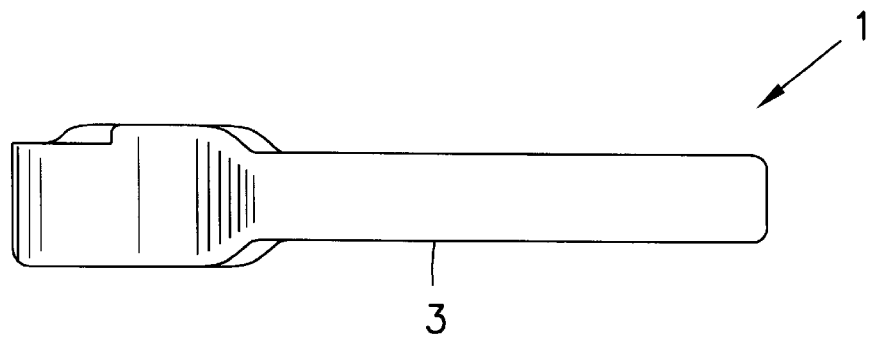
FIG. 2 shows a first side view of the strap attacher according to the invention.
Figure 3:
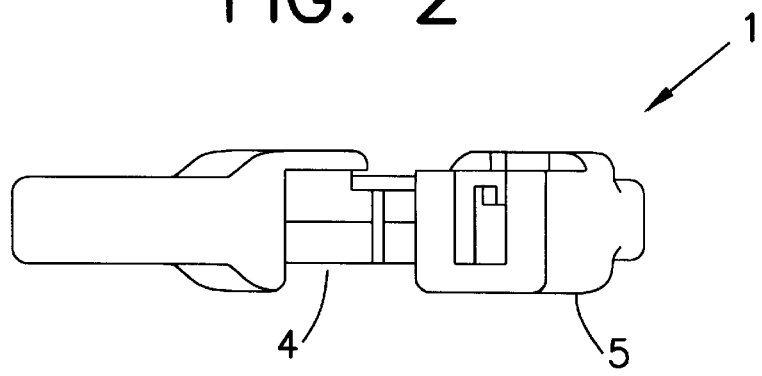
FIG. 3 shows a second side view of the strap attacher according to the invention.

The invention will now be described with reference to FIGS. 1–12, which depict an exemplary embodiment of a strap attacher according to the invention. As shown in FIG. 1, a strap attacher 1 comprises a belt member 2, a surrounding member 3, a male interlocking member 4 and a female interlocking member 5. Belt member 2 is attached at one end to surrounding member 3 via elbow section 6 and at another end to male interlocking member 4 via elbow section 7. Surrounding member 3 is further connected to female interlocking member 5 via elbow section 8. As a result of these connections, when male interlocking member 4 and female interlocking member 5 are engaged together, strap attacher 1 becomes completely enclosed.

Figure 4:
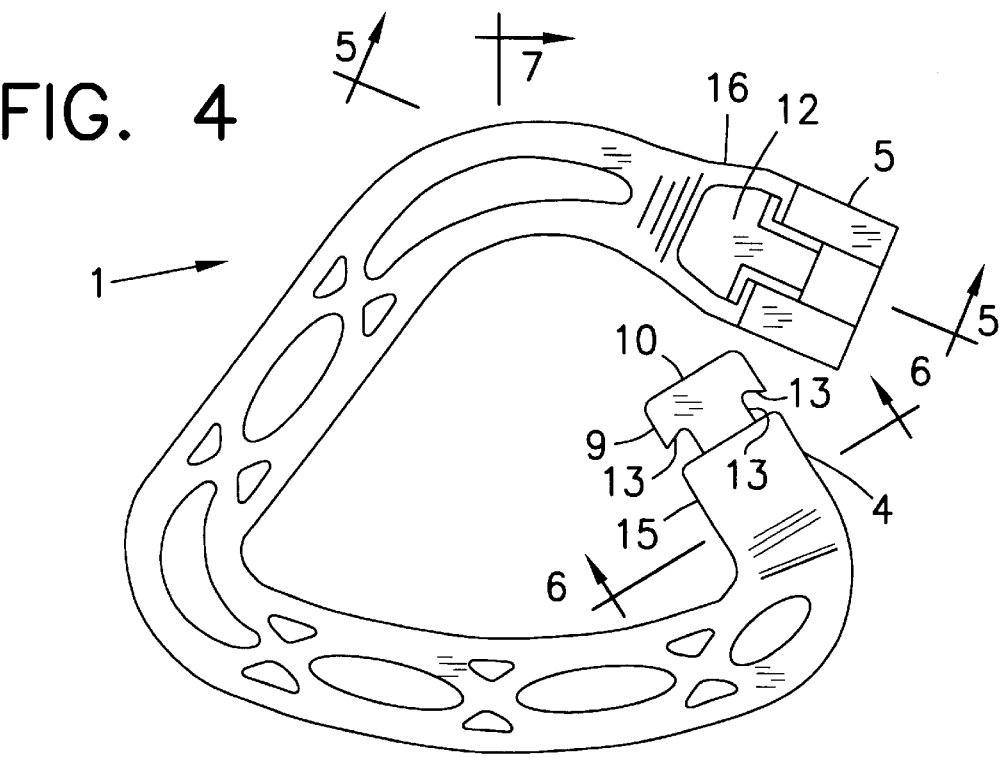
FIG. 4 shows a top view of the strap attacher according to the invention.
Figure 5:
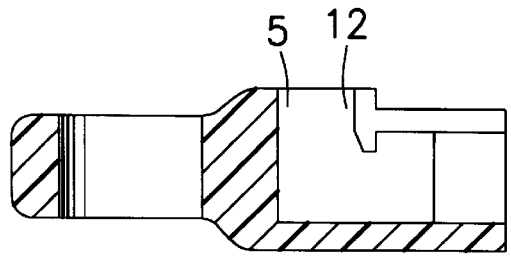
FIG. 5 shows a first side cross-sectional view of the strap attacher according to the invention as shown in FIG. 4, taken along the line 5—5.
Figure 6:
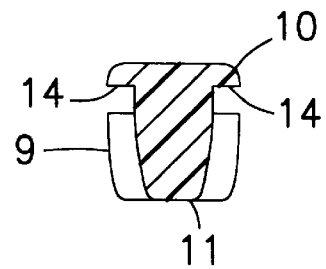
FIG. 6 shows a second side cross-sectional view of the strap attacher according to the invention as shown in FIG. 4, taken along the line 6—6.
Figure 7:
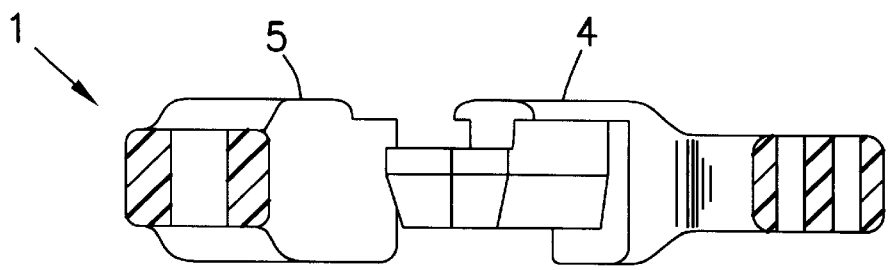
FIG. 7 shows a third side cross-sectional view of the strap attacher according to the invention as shown in FIG. 4, taken along the line 7—7.
Figure 8:
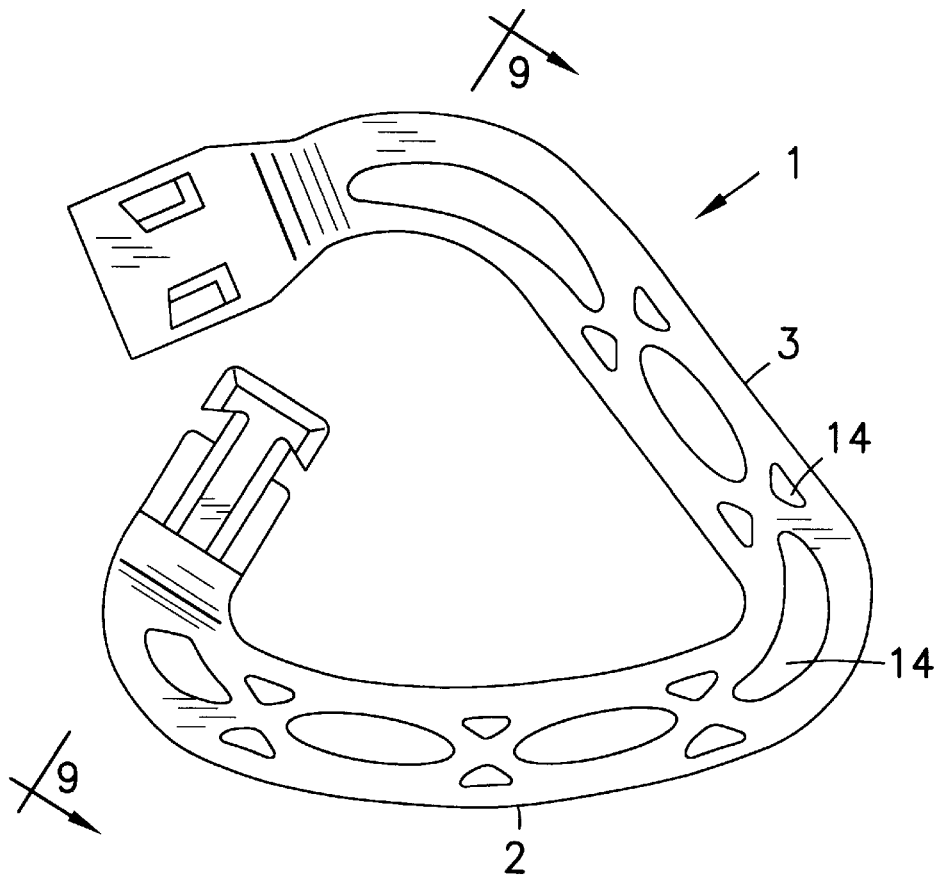
FIG. 8 shows a bottom view of the strap attacher according to the invention.
Figure 9:
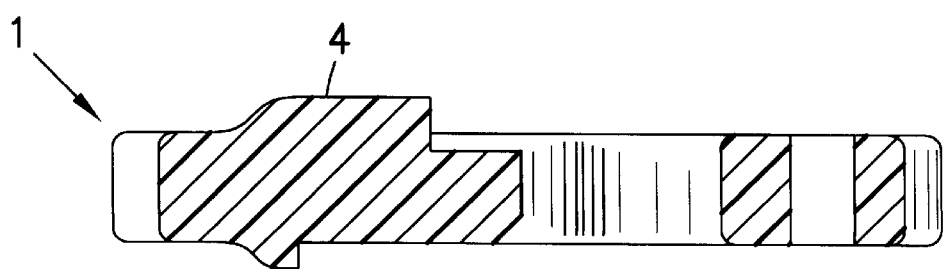
FIG. 9 shows a fourth side cross-sectional view of the strap attacher according to the invention as shown in FIG. 8, taken along the line 9—9.
Figure 10:
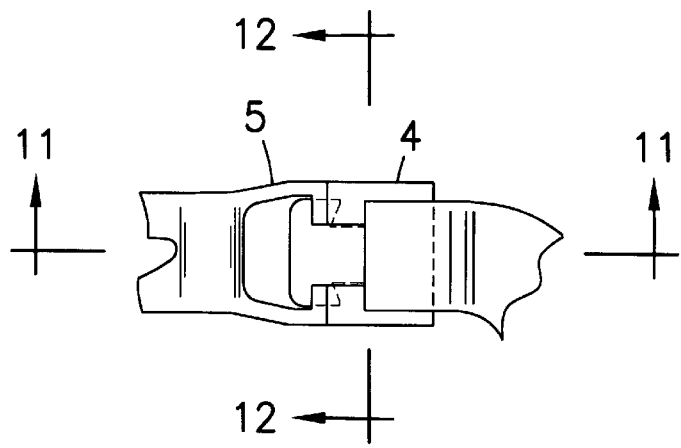
FIG. 10 shows a top view of the connector mechanism of the strap attacher according to the invention, wherein the male and female connector members are interconnected.
Figure 11:
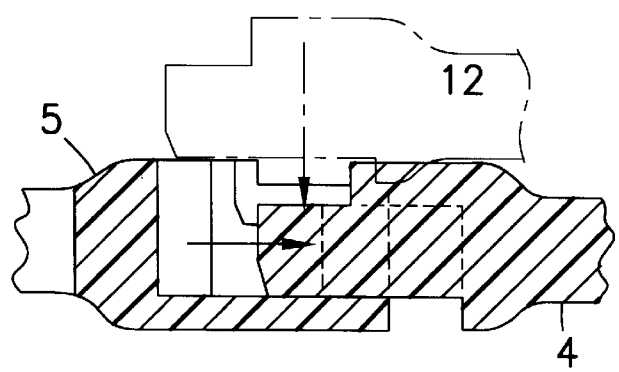
FIG. 11 shows a first side cross-sectional view of the connector mechanism of the strap attacher according to the invention as shown in FIG. 10, taken along the line 11—11.
Figure 12:
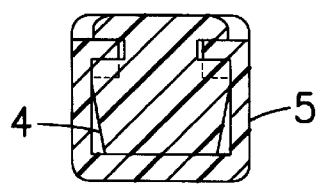
FIG. 12 shows a second side cross-sectional view of the connector mechanism of the strap attacher according to the invention as shown in FIG. 10, taken along the line 12—12.

As shown by FIGS. 1, 4 and 8, the belt member 2 is implemented as a rounded member having a convex curvature with respect to the exterior of the device. Also as shown by FIGS. 1, 4 and 8, the strap attacher 1 is formed with cavities 14 through both the belt member 2 and the surrounding member 3. These cavities 14 may be different sizes and shapes, and may be arranged in a pattern throughout the interior of belt member 2 or surrounding member 3. The size, arrangement and number of cavities 14 can vary based on the particular size and shape of the strap attacher, as will become clear as the characteristics of the strap attacher are further described below.

Strap attacher 1 may be constructed from a variety of materials suitable to withstanding the loading forces produced by restraining straps in operation. The strap attacher 1 is preferably molded from plastic or resin materials, such that all pieces of the strap attacher 1 (as described above) are formed as one unit. However, those with skill in the art will understand that other materials and manufacturing processes may be employed to produce a strap attacher according to the invention.

The male and female interlocking members 4,5 can be implemented in a variety of ways known to those in the art for connecting similarly flexible structures. The connector may be implemented as a releasably connectable connector, or as a "one-time" connectable connector. In the exemplary embodiment of the invention, as shown in FIGS. 1, 5–7 and 10–12, the interlocking mechanism is a sliding "tongue and groove" system which allows the strap attacher to be easily interlocked. The male interlocking member 4 comprises a locking piece 9 protruding distally from a male body 15. The locking piece 9 has an head 10 and a stem 11. The head 10 is wider than the stem 11, creating stopping surfaces 14 on the bottom portion of the head 10. The head 10 is also indented toward the proximate end of the locking piece 9 (i.e. nearest the male body 15) to match the width of the stem 11. This indenting forms locking surfaces 13 on the inner portion of head 10.

The female interlocking member 5 comprises a female body 16 which includes a cavity 12 shaped to accept the head 10 and stem 11 of the locking piece 9 of the male interlocking member 4 when slid downwardly into the cavity 12. When engaged (FIGS. 10–12), the stopping surfaces abut against the interior walls of cavity 12. A connection is formed by sliding the locking piece 9 outwardly (i.e. toward the proximate end of male body 15) until locking surfaces 13 abut against the interior walls of cavity 12, creating a connection. The strap attacher may be uncoupled by inwardly sliding the locking piece 9 until the head 10 is completely free of the interior walls of cavity 12, and upwardly sliding the locking piece 9 out of the cavity 12.

In operation, a belt loop of a restraining strap (not shown) is slipped around the belt member 2 prior to engaging the male and female interconnection members 4,5, such that the belt loop is fully within the strap attacher 1. The strap attacher 1 may then be placed around an anchoring section of a shopping cart (not shown), such as a portion of a metal bar structure of the shopping cart. Once the belt loop has been slid around the belt member 2 and the anchoring section is within the center of the strap attacher 1, the strap attacher 1 is closed by engaging the male interlocking member 4 with the female interlocking member 5 in the manner described above. A strong connection is therefore formed between the restraining system (straps) and the shopping cart (anchoring section).

Application of pressure to the restraining straps (for example, a child pressing against the straps) will result in a force being applied to the strap attacher 1. This force will be manifested at both the belt member 3 (where the strap is attached to the strap attacher 1) and the surrounding member 3 (where the anchor section abuts the strap attacher 1). The resistive qualities of the material used to construct the strap attacher 1 and the design of the strap attacher 1 itself should withstand this load without failure in proper operation.

The strap attacher 1 of the present invention, is further advantageously designed to handle large spontaneous loading (e.g. from jerking of the straps). The curved belt member 3 provides bending flexibility that avoids fracturing and other catastrophic failure, which can occur with straight belt members when sharp loading occurs. When a sharp force is applied by the restraining strap, the curved belt member flexes outwardly, reducing the opportunity for cracks or other breakage of the device.

The strap attacher of the present invention is also capable of avoiding catastrophic failure when minor cracks develop in the belt member 2 or the surrounding member 3. Such cracks can develop due to overloading (such as described above) or from weathering or manufacturing imperfections. If a minor crack or fracture occurs in either member, the crack will only grow upon application of force until it reaches one of the cavities 14 within the member. Once the crack has reached the cavity 14, the growth of the crack will end, maintaining a portion of the belt member 2 or surrounding member 3 as capable of providing resistance to applied forces. Thus complete failure of the strap attacher is avoided.

The cavities 14 can be distributed throughout the strap attacher 1 to optimize the prevention of catastrophic failure. For example, as shown in FIGS. 1, 4 and 8, the cavities 14 may include small cavities and large cavities arranged in an alternating pattern within the belt member 2 and surrounding member 3. The pattern can be chosen as to prevent extension of cracks through the strap attacher, but to avoid serious degradation of the resistive strength of the strap attacher.

In the preceding specification, the invention has been described with reference to a specific exemplary embodiment thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A strap attacher, comprising:

a belt member;

a surrounding member coupled to the belt member at a first end of the surrounding member and a first end of the belt member; and a first connector member coupled to a second end of the belt member and a second connector member coupled to a second end of the surrounding member, wherein the first connector member comprises a male interconnect member including a head and stem, the head being wider than the stem to define a stopping surface, the head including a locking surface on an inner portion, the second connector member comprises a female interconnect member including a cavity with interior walls shaped to receive the head and stem, and the first connector member and second connector member are capable of becoming interconnected to connect the belt member to the surrounding member by sliding the head and stem into the cavity to cause the stopping surface to abut the interior walls and by sliding the head and stem outwardly from the female interconnect member to cause the locking surface of the head to abut the interior walls of the cavity;

wherein at least one of the belt member and the surrounding member contain at least one cavity therethrough.

2. The strap attacher of claim 1, wherein the belt member is rounded.

3. The strap attacher of claim 1, wherein the first connector member is the female interconnect member and the second interconnect member is the male interconnect member.

4. The strap attacher of claim 1, wherein the strap attacher is formed from plastic.

5. The strap attacher of claim 1, wherein at least one of the belt member and the surrounding member includes a plurality of cavities therethrough.

6. The strap attacher of claim 5, wherein the plurality of cavities are arranged in a pattern.

7. The strap attacher of claim 1, wherein the belt member and the surrounding member each contain a plurality of cavities arranged therethrough.

\* \* \* \* \*